United States Patent [19]
Bouvard et al.

[11] Patent Number: 4,697,873
[45] Date of Patent: Oct. 6, 1987

[54] DEVICE FOR PROTECTING OPTICAL FIBERS FREED AT THE END OF A CABLE ELEMENT

[75] Inventors: André Bouvard; Jean Pierre Hulin, both of Conflans Ste Honorine, France

[73] Assignee: Lignes Telegraphiques et Telephoniques, Conflans Ste Honorine, France

[21] Appl. No.: 361,822

[22] Filed: Mar. 25, 1982

[30] Foreign Application Priority Data
Apr. 3, 1981 [FR] France .................. 81 06771
May 26, 1981 [FR] France .................. 81 10453

[51] Int. Cl.⁴ .............................................. G02B 6/44
[52] U.S. Cl. ............................................... 350/96.23
[58] Field of Search ................................... 350/96.23

[56] References Cited
U.S. PATENT DOCUMENTS
4,153,332  5/1979  Longoni .................. 350/96.23

FOREIGN PATENT DOCUMENTS
2049220  12/1980  United Kingdom .

Primary Examiner—Robert E. Wise

[57] ABSTRACT

The device for protecting optical fibers freed at the end of a cable element comprises a sleeve in which the end of the cable element is forcibly fitted, and a plurality of flexible sheaths mounted in securely fixed relation in the line of extension of the sleeve. Each optical fiber which has been freed from the cable element is positioned within and protected by a corresponding sheath.

16 Claims, 4 Drawing Figures

DEVICE FOR PROTECTING OPTICAL FIBERS FREED AT THE END OF A CABLE ELEMENT

This invention generally relates to optical fiber transmission systems and more particularly to a device for the protection of optical fibers which are left free at the end of a cable element and intended to be connected to electronic equipment units such as repeaters, for example.

As a general rule, an optical fiber transmission cable is made up of a plurality of cable elements having a predetermined type of structure within a protective cladding and jacket assembly. One of the known optical-fiber cable-element structures consists of a cylindrical support of dielectric material which is reinforced along its axis and in which are formed longitudinal or helical grooves having either a simple or alternate twist, said grooves being disposed at uniform intervals around the periphery of said support, one optical fiber being housed within each groove. A cable structure of this type is described in particular in U.S. patent application No. S.N. 877,872 relating to: "Cable incorporating optical fibers".

Furthermore, at the time of laying of optical fiber transmission cables between two so-called main stations, it is a known practice to instal a so-called secondary station having the same structure as a main station or in other words comprising a so-called subdistributor room for receiving the different transmission cables and a so-called repeater room in which an array of racks is installed. Each rack is composed of at least one cable head designed in the form of a frame for receiving the optical fibers of one cable element, and a compartment for electronic equipment units such as, in particular, repeaters for amplifying the optical signals transmitted by each optical fiber.

Furthermore, at the time of laying of cables on site, a known method is already in current use for connecting the optical fibers of cables to electronic equipment units. This method involves the following operations performed on the ends of transmission cables which are brought into a main station or a secondary station:

the ends of the cables are stripped over a predetermined length in order to free their corresponding cable elements;

the different elements of one and the same cable which may first be spliced if necessary are then placed within a dividing unit which has a switching function, said unit being mounted within the subdistributor so as to direct each cable element to a corresponding rack;

at the level of the cable head of each rack, the end of each cable element is stripped over a predetermined length in order to free the optical fibers;

connectors are mounted at the ends of the fibers of one and the same cable element and placed in alignment within the cable head;

a single-channel cord consisting of a sheathed optical fiber is positioned on each connector;

the single-channel cords are connected to the inputs of repeaters, for example, either directly by means of a welding operation or through the intermediary of other connectors;

the outputs of the repeaters are connected to the ends of other transmission cables, the procedure being identical with the operation described earlier.

However, the operations of the method described above which consist in stripping each cable element over a predetermined length and mounting a connector at each fiber extremity are subject to disadvantages. In fact, the optical fibers which are thus left free are in the bared state within the cable head and this gives rise to a potential danger of breakage of said fibers. In consequence, the bare fibers cannot readily be handled by an operator. Furthermore, the assembly of the connectors at the ends of the fibers is a delicate operation and takes a relatively long time to perform. A further drawback lies in the fact that the connectors disposed in line within the cable head take up a relatively large amount of space.

The aim of this invention is to overcome these disadvantages by proposing a device which ensures protection of optical fibers at the exit of one and the same cable element after stripping and which proves wholly satisfactory. Said device is of simple structural design, is inexpensive to produce, and guarantees good mechanical strength of the fibers, thus removing any danger of breakage of said fibers.

To this end, the invention is directed to a device for the protection of at least one optical fiber freed at the end of a cable element, comprising a member forming a sleeve in which the end of the cable element is intended to be forcibly fitted, and at least one flexible sheath in the form of a tube mounted in securely fixed relation in the line of extension of the sleeve so as to extend in the outward direction, the optical fiber which has been freed from the cable element being positioned within and thus protected by said sheath.

According to another feature of the invention, the sleeve is provided on its internal periphery with at least one radial tooth extending substantially over the entire length of the sleeve. The tooth is provided with at least one longitudinal bore which is aligned along the axis of the sheath and through which the optical fiber is introduced. The fiber consequently slides longitudinally within the bore of the tooth and is positioned within the sheath, the fiber being thus guided by the tooth as it passes through the sleeve.

It is apparent that the sleeve mounted at the end of the cable element will thus ensure perfect fluid-tightness of said element and that the teeth pierced with bores will serve to guide each fiber longitudinally within the interior of the sleeve, with the result that each fiber brought out from the cable element will progress with precision along a linear path within the interior of the sleeve and of the sheath, thereby removing any potential danger of breakage of said fibers. Furthermore, each optical fiber within its protective sheath can readily be handled by an operator.

The invention is also directed to a cable element provided with a protection device according to the invention and to the utilization of a cable element of this type. Said utilization is distinguished by the fact that the protection device is mounted within a cable head installed in a rack so as to permit connection of optical fibers to electronic equipment units mounted in the rack.

These and other features of the invention will be more apparent upon consideration of the following detailed description and accompanying drawings, in which.

In the different figures, the same references relate to the same elements.

Figure 1:
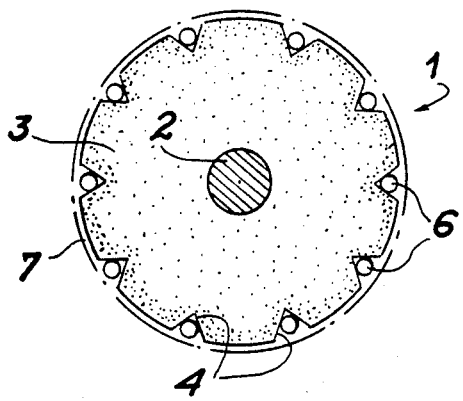
FIG. 1 is a transverse sectional view of an optical fiber cable element.

In one example of construction and referring to FIG. 1, the reference numeral 1 designates a cable element consisting of optical fibers which are intended to be connected to electronic equipment units mounted within a rack. Said rack is installed within a main station or secondary station of an optical fiber transmission system.

The cable element 1 comprises a central reinforcement or core 2 for endowing the cable with rigidity and absorbing longitudinal stresses. Said core is surrounded by a cylindrical reinforcement rod or support 3 of dielectric material in which are formed longitudinal or helical grooves 4 having either a simple or alternate twist. Said grooves can have a V-shaped profile, for example, and are spaced at uniform intervals on the external surface of the support 3. An optical fiber 6 is housed within each groove 4 and the protective jacket of the cable element 1 is shown at 7.

In order to connect the optical fibers of a transmission cable made up of a plurality of cable elements of the type shown at 1 in FIG. 1 to electronic equipment units such as repeaters, for example, the first operations consist in stripping the cable end over a predetermined length in order to free or separate the different cable elements 1. After passing through a dividing member mounted within the subdistributor of the secondary station, each cable element 1 is directed towards a cable head in the form of a frame installed in a corresponding equipment rack of said station.

The following operations consist in stripping the end of the cable element 1 over a predetermined length at the level of the cable head, in opening-out the fibers 6 thus freed, the assembly consisting of core 2 and support 3 which has thus been freed from its fibers being then cut-off at right angles to the axis of said cable element.

The following operation consists in making use of the protection device according to the invention for protecting each optical fiber 6 which has thus been freed. The device will now be described with reference to FIGS. 2 to 4.

Figure 2:
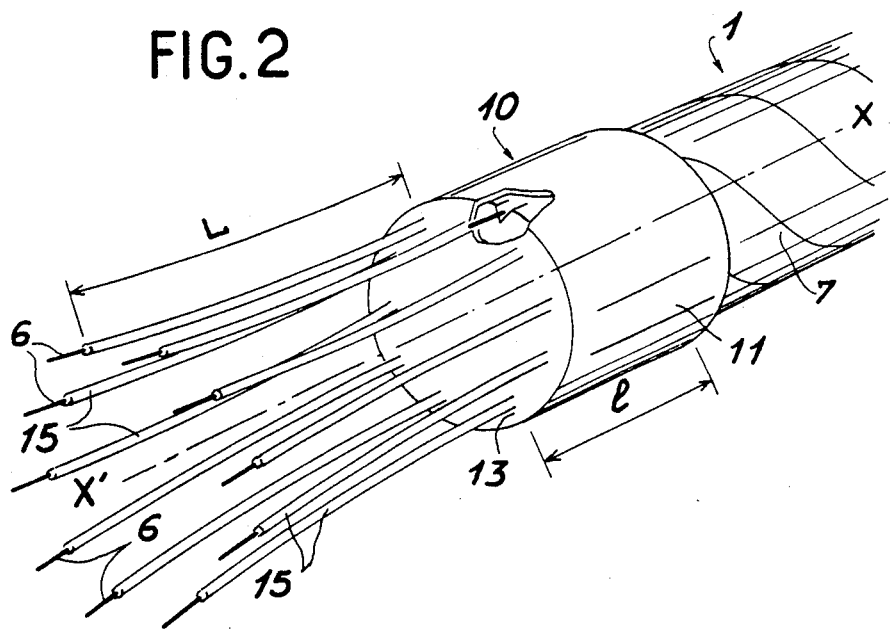
FIG. 2 is a view in perspective showing the exit face of the protection device mounted on the end of the cable element, according to a first embodiment.

In a first embodiment shown in FIG. 2, the device 10 for protecting optical fibers comprises a heat-shrinkable cylindrical sleeve 11 having an axis X—X', a length 1, and formed of elastomer, for example, the end of the support of the cable element 1 being intended to be forcibly fitted within said sleeve.

The sleeve 11 is provided on its end face 13 with an assembly of flexible sheaths 15 in the form of tubes having a predetermined length L and extending in the outward direction. The number of sheaths 15 is equal to the number of optical fibers 6, with the result that each fiber is positioned substantially over its entire length within the corresponding sheath 15. Thus each optical fiber 6 which has been freed at the end of the cable element 1 is protected mechanically by each sheath 15.

Furthermore, the protective sheaths 15 are arranged in uniformly spaced relation at the periphery of the end face 13 of the sleeve 11 and at the same angular intervals as the grooves of the support 3 (shown in FIG. 1), with the result that the optical fibers 6 are capable of sliding longitudinally within the corresponding sheaths 15.

Said sheaths 15 are advantageously molded in one piece with the sleeve 11. Said sleeve and the protective sheaths thus constitute a unitary assembly which is designed substantially in the form of a "glove".

It will be noted that the sleeve 11 can also be provided with reinforcement wires without thereby departing from the scope of the invention.

In order to mount the protection device 10 on the cable element 1, the first step consists in threading the optical fibers 6 in their respective sheaths 15 after passing them through the heat-shrinkable sleeve 11. The sleeve 11 is then mounted on the end of the support of the cable element 1 and said sleeve is heated in order to ensure that this latter is rigidly fixed to said cable element.

Figure 3:
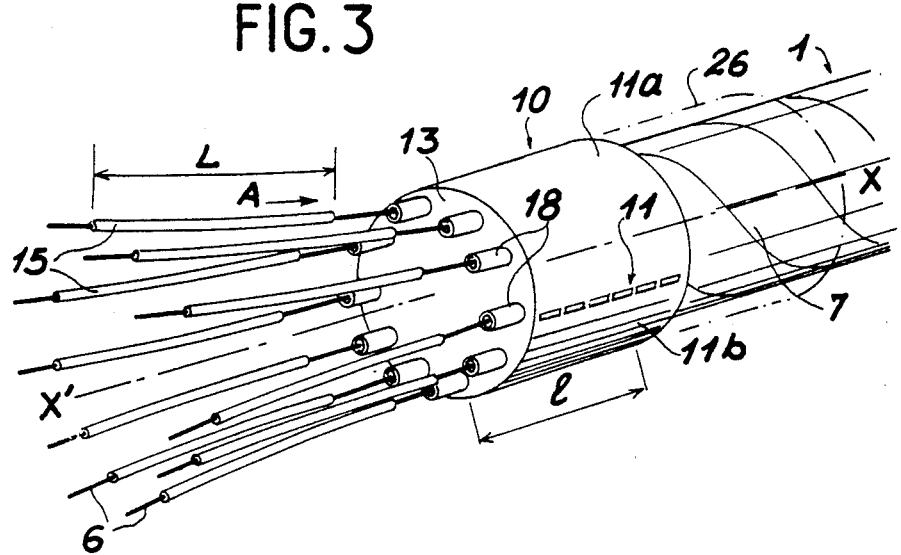
FIG. 3 is a view which is similar to FIG. 2, in a second embodiment.
Figure 4:
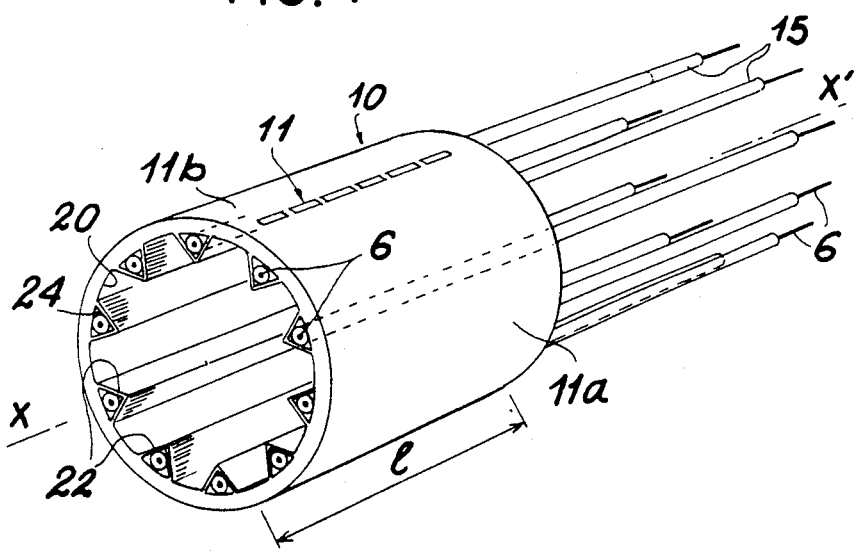
FIG. 4 is a view in perspective of the entrance face of the protection device shown in FIG. 3 but without the cable element, the optical fibers being positioned within the sheaths.

A second preferred embodiment is illustrated in FIGS. 3 and 4, elements which are identical with those of FIG. 2 being designated by the same reference numerals. In these figures, the heat-shrinkable sleeve 11 is designed for example in two parts 11a and 11b and is provided on its exit end face 13 with an array of members forming hollow studs 18 which project longitudinally from said sleeve.

The hollow studs 18 are uniformly spaced at the periphery of the end face 13 of the sleeve and at the same angular intervals as the grooves 4 of the support 3 (shown in FIG. 1).

As an advantageous feature, the hollow studs 18 are molded in one piece with the sleeve 11 and are formed of elastomer, for example.

Furthermore, the protective sheaths 15 are fitted on the hollow studs 18 as indicated by the arrow A in FIG. 3 in such a manner as to ensure that the end of each sheath 15 is rigidly fixed in position around the corresponding stud 18.

As is apparent from FIG. 4 which illustrates the entrance face of the sleeve of FIG. 3, the heat-shrinkable sleeve 11 is provided on its internal periphery 20 with a series of members forming radial teeth 22 which extend over the full length 1 of the sleeve. The teeth 22 are equal in number to the grooves 4 of the cable element support 3 and are spaced within the sleeve 11 at the same angular intervals as the grooves 4 of said support 3. Furthermore, the teeth 22 have a shape in transverse cross-section which is identical with the shape of the grooves 4 (in other words a V in the example chosen) and have substantially smaller dimensions than the grooves 4. In consequence, each tooth 22 will correspond internally to the shape of each groove 4 at the time of insertion within said groove, as will become apparent hereinafter.

The teeth 22 are advantageously molded in one piece with the sleeve 11 and are formed of elastomer, for example.

Moreover, each tooth 22 is pierced with a longitudinal bore 24 which is aligned with the corresponding hollow stud 18 (shown in FIG. 3) and disposed along the axis of each fiber 6 carried by the support 3 of the cable element. The diameter of each bore 24 is equal to the diameter of each hollow stud 18 and is slightly larger than that of each fiber 6.

In order to carry out positioning of the optical fibers 6 within the protective sheaths 15, the initial step consists in introducing said fibers within the corresponding bores 24 (shown in FIG. 4). By displacing the sleeve 11 in translational motion, the optical fibers are caused to slide longitudinally within said bores. Thus the teeth 22 serve to guide the fibers as they pass through the sleeve. After passing out of the bores 24, the fibers then pass through the corresponding hollow studs 18 (shown in FIG. 3) and are positioned longitudinally within the corresponding attached sheaths 15. Thus said sheaths provide mechanical protection for the fibers which have been freed at the end of the cable element 1.

Once the optical fibers have been positioned within the protective sheaths, the following operation consists in mounting the protection device 10 on the cable element support. To this end, a translational displacement of the sleeve 11 causes the teeth 22 to be inserted by sliding within the corresponding grooves 4 of said support while closely conforming internally to the shape of said grooves. It is worthy of note that, during this tooth-inserting operation, the optical fibers carried by the support 3 rest in a flat position within the corresponding bores 24, thus making it possible to obtain perfectly linear positioning of said fibers.

The heat-shrinkable sleeve 11 is then heated so as to ensure that it is rigidly fixed to the cable element. The teeth inserted in the grooves of the support thus ensure that the sleeve is securely locked in position with respect to the support and serve to prevent any rotational displacement of said sleeve.

In order to guarantee perfect fluid-tightness of the cable element at the level of its junction with the sleeve, provision is preferably made for a longitudinal sleeve extension 26 shown in dashed outline in FIG. 3 and applied against the jacket 7 of the cable element.

The connection of optical fibers 6 of one and the same cable element 1 to supplied electronic equipment units is completed by installing the protection device 10 within the cable head and by connecting the sheathed optical fibers to said equipment units either directly by welding or by means of connectors mounted at the ends of said sheathed fibers.

It will be noted that the foregoing description has been given with reference to a device for protecting all the optical fibers of one stripped cable element in order to ensure that they are connected respectively to electronic equipment units. As will readily be apparent, other uses of said device for protecting optical fibers may be contemplated without thereby departing either from the scope or the spirit of the invention.

By way of example, the protection device contemplated by the invention may accordingly be employed for carrying out a branching operation on one of the fibers carried by a cable element. In this case, the protection device is composed of a sleeve extended by a single sheath in which the optical fiber is positioned after it has been freed from its support. The branched-off fiber protected by its sheath can then be connected to any suitable electronic equipment.

What is claimed is:

1. A device for protecting at least one optical fiber freed at the end of a cable element, said device comprises a sleeve adapted to be forcibly fit over the end of the cable element, said sleeve having an end face, and at least one flexible sheath in the form of a tube securely mounted to and projecting from said end face outwardly away from the sleeve, said at least one optical fiber freed from the cable element being positioned within, and this protected by, said tube.

2. A device according to claim 1, wherein said sleeve is of heat-shrinkable material.

3. A device according to claim 1 or claim 2, wherein said sheath is molded in one piece with said sleeve.

4. A device according to claim 1, wherein said device further comprises at least one member forming a hollow stud which projects longitudinally from said sleeve and to which the sheath is attached so that the optical fiber is passed through said hollow stud and positioned within said sheath.

5. A device according to claim 4, wherein said hollow stud is molded in one piece with said sleeve.

6. A device according to claim 1, wherein said sleeve is provided on its internal periphery with at least one member forming a radial tooth which extends substantially over the entire length of said sleeve and wherein said tooth is provided with at least one longitudinal bore which is aligned along the axis of the sheath and through which the optical fiber is introduced so that said fiber is subjected to a longitudinal sliding displacement within the bore of the tooth and positioned within the sheath, the fiber being thus guided by the tooth as it passes through the sleeve.

7. A device according to claim 6, wherein said tooth is molded in one piece with said sleeve.

8. A device according to claim 1, wherein said sleeve is made up of at least two components.

9. In combination: a cable element having at least one optical fiber freed at one end of said cable element, and a device for protecting said at least one optical fiber, said device comprising a sleeve forcibly fit over said end of said cable element, said sleeve having an end face, and at least one flexible sheath in the form of a tube securely mounted to and projecting from said end face outwardly away from the sleeve, said at least one optical fiber freed from the cable element being positioned within, and thus protected by, said tube.

10. The combination according to claim 9 wherein said element comprises a cylindrical support in which a plurality of grooves are formed in the periphery of said support and at least one optical fiber is housed within each groove, said fibers being freed at the end of the support, wherein the sleeve has a cylindrical shape, wherein the teeth of said sleeve are equal in number to the grooves of said support, and wherein said teeth and the sheaths for protecting the optical fibers are spaced at the same angular intervals as the grooves of said support, each tooth being thus inserted within each groove at the time of mounting of the sleeve on the end of said support.

11. The combination according to claim 10, wherein said teeth and said grooves each have an identical shape in transverse cross-section, the dimensions of the teeth being substantially smaller than the dimensions of the grooves so that each tooth accordingly conforms internally to the shape of each groove at the time of insertion of said tooth within said groove.

12. The combination according to claim 11, wherein said teeth and said grooves each have a V-shaped transverse cross-section.

13. The combination according to claim 10, wherein the bore of each tooth is disposed along the axis of each fiber carried by the cable element so that the fibers carried by said element rest in a flat position within the corresponding bores of the teeth after said teeth have been inserted in the grooves.

14. The combination according to claim 10, wherein said element further comprises a protective jacket around the cylindrical support and wherein the periphery of the sleeve end at which said support is forcibly engaged comprises a longitudinal extension which is applied against the cable element jacket at the time of assembly of said sleeve.

15. The combination according to claim 9, and a cable head installed in a rack, said protection device being mounted within said cable head so as to permit connection of optical fibers to electronic equipment units mounted within the rack.

16. The combination according to claim 15, said rack being installed in a main station for an optical fiber transmission system.

* * * * *